United States Patent
Hayek et al.

[11] Patent Number: 6,044,419
[45] Date of Patent: *Mar. 28, 2000

[54] MEMORY HANDLING SYSTEM THAT BACKFILLS DUAL-PORT BUFFER FROM OVERFLOW BUFFER WHEN DUAL-PORT BUFFER IS NO LONGER FULL

[75] Inventors: George Hayek, Cameron Park; Colyn Case, Grass Valley, both of Calif.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/941,169

[22] Filed: Sep. 30, 1997

[51] Int. Cl.[7] ............................................. G06F 13/14
[52] U.S. Cl. ........................... 710/57; 710/53; 345/521
[58] Field of Search .......................... 395/877, 872, 395/873, 858; 710/52, 53, 57, 521

[56] References Cited

U.S. PATENT DOCUMENTS

| | | | |
|---|---|---|---|
| 4,685,057 | 8/1987 | Lemone et al. | 364/200 |
| 5,107,457 | 4/1992 | Hayes et al. | 395/800 |
| 5,313,577 | 5/1994 | Meinerth et al. | |
| 5,315,696 | 5/1994 | Case et al. | |
| 5,315,698 | 5/1994 | Case et al. | |
| 5,321,806 | 6/1994 | Meinerth et al. | |
| 5,321,810 | 6/1994 | Case et al. | |
| 5,406,554 | 4/1995 | Parry | 370/79 |
| 5,602,780 | 2/1997 | Diem et al. | 365/189.01 |
| 5,623,692 | 4/1997 | Priem et al. | 395/823 |
| 5,692,156 | 11/1997 | Bahls et al. | 395/492 |
| 5,696,990 | 12/1997 | Rosenthal et al. | 395/849 |
| 5,784,650 | 7/1998 | Gulick et al. | 395/882 |
| 5,822,776 | 10/1998 | Korte et al. | 711/167 |
| 5,841,722 | 11/1998 | Willenz | 365/221 |
| 5,892,979 | 4/1999 | Shiraki et al. | 710/52 |

*Primary Examiner*—Thomas C. Lee
*Assistant Examiner*—Albert Wang
*Attorney, Agent, or Firm*—Blakely, Sokoloff, Taylor & Zafman LLP

[57] ABSTRACT

The present invention relates to a method and apparatus for buffering data. The apparatus stores information in a buffer. When the buffer is full, overflow data is stored in an overflow memory. As data is removed from the buffer, the overflow data is transferred from overflow memory to the buffer.

18 Claims, 2 Drawing Sheets

MEMORY HANDLING SYSTEM THAT BACKFILLS DUAL-PORT BUFFER FROM OVERFLOW BUFFER WHEN DUAL-PORT BUFFER IS NO LONGER FULL

BACKGROUND OF THE INVENTION (1) Field of the Invention

The present invention relates to buffering data in a computer system. More particularly, the present invention relates to handling overflow data which results when a buffer is full.

(2) Related Art

Traditional buffers are designed to handle a worst case scenario. These buffers, typically located on an integrated circuit in computer system memory or on a card such as in a local graphics frame buffer memory are typically quite large (on the order of megabytes). These buffers must be large to manage the maximum possible mismatch between the generation of commands from a data source and the consumption of data by a data user. Such massive storage is unwieldly and expensive.

Two implementations of memory are used to generate large buffers. A first implementation of memory uses a very large first-input first-output (FIFO) buffer. In some embodiments, dual-ported implementations of FIFO buffers may be used. Dual ported memory can simultaneously handle input and output, and thus are faster than system memory. However such large dual-ported FIFOs are expensive.

A second implementation of a buffer uses the system memory of a computer. Such an implementation may result in excessive data traffic to system memory. Furthermore, system memory is typically single-ported to support only one read or write operation at a time. System memory typically cannot handle concurrent read and write streams. The single-ported characteristic makes system memory buffers slower than FIFO buffers. In high speed imaging applications, slow speeds may be unacceptable.

In view of the expense of large FIFO buffers and the slower speeds of system memory, a method and apparatus which uses smaller FIFO buffers most of the time and system memory as an overflow memory is desirable. Such a system will be described in the following patent application.

BRIEF SUMMARY OF THE INVENTION

A memory handling system is described. The memory handling system includes a dual-port buffer which receives data. A fill-logic determines when the dual-port buffer is full. When the fill logic determines that the dual-port buffer is full, a memory controller routes data to an overflow memory.

DETAILED DESCRIPTION OF THE INVENTION

In the following description and illustration, a number of examples will be used for convenience. For example, the system will be described in terms of transferring data from a central processing unit to a 3D graphics accelerator. The example of transferring data for graphics applications is appropriate because graphics applications typically require a rapid stream of data. A large FIFO buffer between the CPU and graphics accelerator or graphics processor temporarily stores the CPU produced data until needed by the graphics processor. However, it is understood that the particular circuit layout, the design and use of the buffer and the type of memory used for the overflow are done for illustrative purposes to facilitate understanding of the invention, and that one of ordinary skilled in the art may vary the design parameters and still remain within the scope of the invention.

Figure 1:
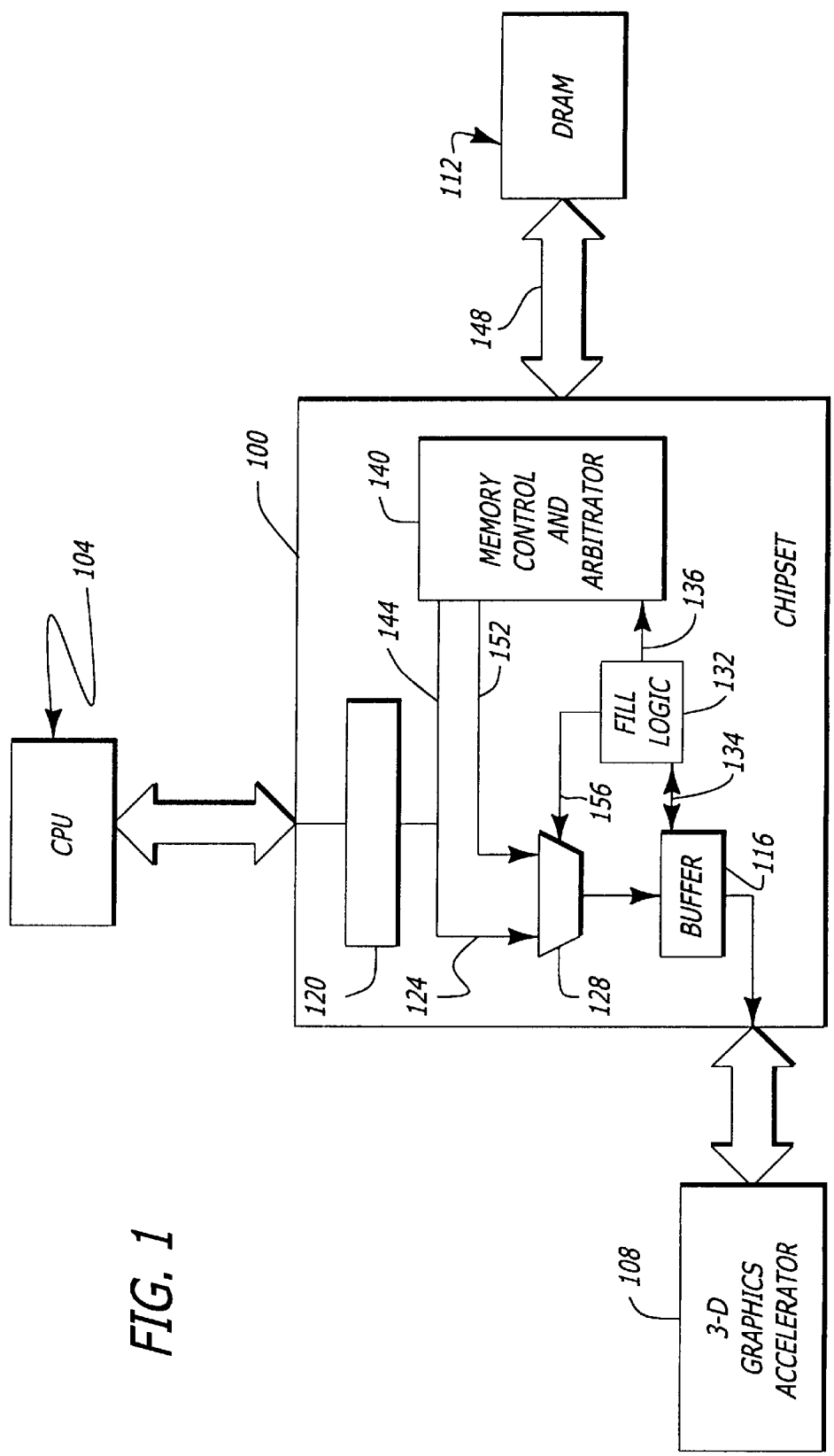
FIG. 1 is a block diagram illustrating one embodiment of the circuitry used in the memory handling system of the present invention.

FIG. 1 illustrates a chipset 100 of the current invention. The chipset 100 may be an integrated circuit or a part of an integrated circuit. The chipset 100 is coupled to a source of data 104 such as a CPU and a data user 108 such as a 3D graphics accelerator. Typically, data flows from the data source 104 through the chipset 100 to the data user 108. The chipset 100 may be an integrated circuit. The chipset 100 may also be implemented as part of an overall integrated circuit chip such as a graphics processor integrated circuit. In prior art systems, the data from the data source 104 was stored in the chipset 100 until needed by the data user 108. In the current invention, when the capacity of a buffer 116 in the chipset 100 is exceeded because of the speed mismatch between the data source 104 and the data user 108, the chipset 100 will output the overflow data to an overflow memory 112. In a preferred embodiment, the overflow memory 112 is a system memory. Typically, the overflow memory 112 is a dynamic random access memory external to the chipset 100 or an integrated circuit containing the chipset 100. One method of storing data in overflow memory 112 utilizes a mapping unit. In one embodiment, the mapping unit may be implemented within memory controller 140. The mapping unit allows the use of discontiguous memory pages within the overflow memory 112. In one embodiment, the mapping unit conforms to advanced graphics port (AGP) specifications. When data user 108 removes data from the buffer 116 so that the chipset 100 is once again capable of handling data flow, the data stored in the overflow memory 112 is transferred to the buffer 116. Buffer 116 forwards the data to the data user 108 as needed.

Within the chipset 100, the buffer 116 temporarily stores data transmitted from the data source 104 to the data user 108. The buffer 116 is preferably a dual-port, first-input first-output (FIFO) buffer which handles mismatches in data speed between the data source 104 and the data user 108. The size of the buffer is designed to handle "normal loads." A normal load may be a statistical average of the mismatch between the data source 104 and the data user 108. Thus, in worst case scenarios, it is understood that the buffer 116 will not be able to store all of the data. In one embodiment, the buffer capacity is one standard deviation larger than the statistical average of data stored in the buffer. When the system is operating in a non-overflow condition, the data flows from the data source 104 to a register 120. Register 120 temporarily stores data so that circuitry, such as fill logic 132, may decide the proper direction of data. Register 120 transfers the received data along data path 124 through a multiplexer 128 and into the buffer 116 and finally as needed to the data user 108.

A fill logic 132 monitors the condition of the buffer 116 using control line 134. The fill logic 132 determines when the buffer 116 is full and transmits a FULL SIGNAL indicating the buffer 116 is full. The fill logic 132 also determines when the buffer 116 is no longer full and will alter a state of the FULL SIGNAL or transmit a NOT-FULL SIGNAL. One method by which the fill logic 132 can monitor buffer 116 is by using pointers which point to the beginning and the end of buffer 116. In an alternate embodiment, the fill logic 132 may monitor the data flows into the buffer 116 and out of the buffer to determine when the mismatch has reached a point that the buffer 116 is full.

Once fill logic 132 determines that the buffer 116 is full, the fill logic 132 transmits a FULL SIGNAL along line 136 to memory control and arbitor 140. When fill logic 132 transmits a FULL SIGNAL, the chipset 100 enters an overflow mode. Upon receiving a buffer full signal, data transfer occurs along line 144 instead of line 124. In one embodiment of the invention, a switch on demultiplexer (not shown) under the control of the memory control and arbitor 140 may be used to direct data to line 124 or signal path 144. In an alternate embodiment, a standard bus may be used. Thus, when the buffer 116 is full, data flows from the data source 104 through register 120 along signal path 144 and signal path 148 to the overflow memory 112. Typically, the overflow memory 112 is a memory external to the chipset 100. The overflow memory may be computer system memory accessible by the rest of the computer system. In one embodiment, overflow memory 112 is a dynamic random access memory.

As the data user 108 continues to withdraw data from the buffer 116, fill logic 132 determines when the buffer 116 is no longer full. When the fill logic 132 determines that the buffer 116 is no longer full, a NOT FULL signal is transmitted along line 136 to the memory control and arbitor 140. The memory control and arbitor 140 starts a "back flow" of data from overflow memory 112 through the buffer 116 to the data user 108. The NOT FULL signal transmitted along line 136 causes the memory control and arbitor 140 to transfer data from the overflow memory 112 along signal path 148, through line 152 and multiplexer 128 to the buffer 116 where the previously overflow data fills the buffer 116.

The "backfilling" of data in the previously described back flow process maintains the ordering of data. When new data is generated by the data source 104 while the buffer 116 is being backfilled from the overflow memory 112, the new data continues to be routed from the data source 104 to the overflow memory 112. During the overflow mode, data flows from the data source 104 to the overflow memory 112 and then to the buffer 116 before going to a data user 108 such as a graphics card. The backfilling of data maintains the "first-in, first-out" property of a traditional FIFO buffer. This data is input into the buffer 116 in the sequence it was received at the overflow memory 112.

During overflow mode, the chipset 100 uses a single-port overflow memory as a extra buffer. The single-port overflow -memory may be designed to be fast enough to input data into the buffer 116 from a first port at a rate which allows continuous output from a second port of buffer 116. Thus data is constantly available to a data-user 108 such as a 3-D graphics accelerator. Thus even in overflow mode, the current invention provides advantages over the prior art.

A second advantage of the described system over prior art systems is reduced data traffic to the system memory compared to prior art systems which utilized the system memory as the sole buffer.

Fill logic 132 controls multiplexer 128 by transmitting a select signal along signal path 156 to the select input of the multiplexer 128. The select signal determines whether data going into the buffer 116 comes from the overflow memory 112 via signal path 152 or from the data source 104 via signal line 124. When chipset 100 is in an overflow mode, which typically occurs when the data source 104 and data user 108 are significantly mismatched, the select signal from the fill logic 132 routes data flow along signal line 152 to the buffer 116. When buffer 116 is capable of handling the data flow from data source 104, the fill logic 132 sets the select line 156 such that the multiplexer 128 forwards data from the data source 104 directly into buffer 116. Thus, in one embodiment of the invention, the multiplexer 128 is under control of fill logic 132. It is recognized that in alternate embodiments, the memory control and arbitor 140 may control the multiplexer 128.

Figure 2:
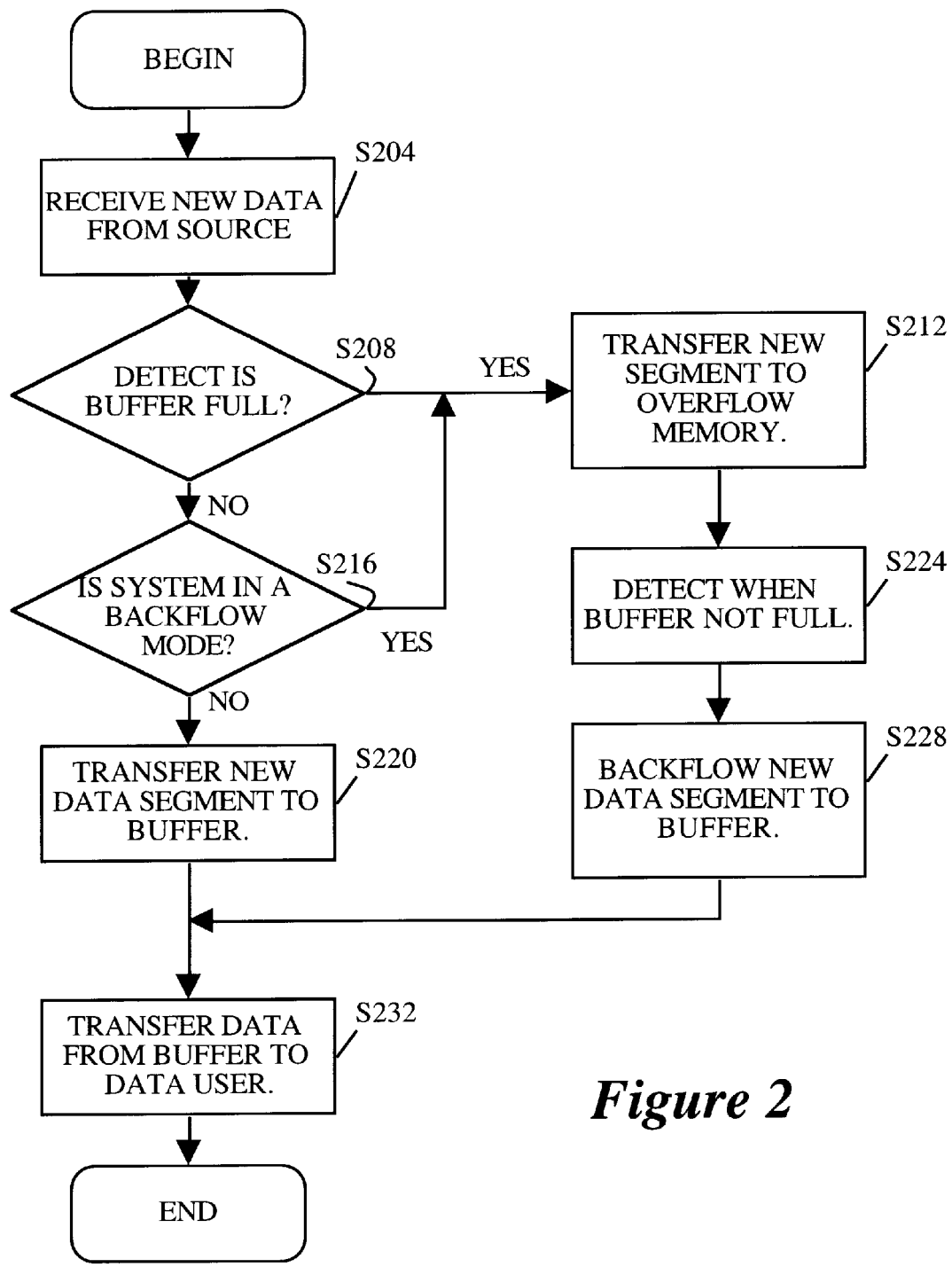
FIG. 2 is a flow diagram illustrating the steps executed by the memory handling system of the present invention.

FIG. 2 illustrates a flow diagram showing the processing of a single segment of data as handled by the chipset 100 when receiving the single segment of data from the data source 104. Typically, the new segment is part of a data stream. In step S204, the chipset 100 receives the new segment of data from the data source 104. In step S208, the fill logic determines whether the buffer 116 is full or not full. If the buffer is full, the memory control and arbitor transfers the new segment to overflow memory in step S212. In step S208, when the fill logic determines that the buffer is not full, the memory control and arbitor determines whether the system is in a backflow mode in step S216. One method of determining whether a system is in backflow mode is by determining whether data is stored in the overflow memory. In a backflow mode, data is being flowed from the overflow memory to the buffer. As a consequence, direct input of new data from the data source 104 into the buffer 116 will create errors in the order of data in a first-input first-output buffer. Thus, if in step S216 it is determined that the system is in a backflow mode, the new data segment is transferred to overflow memory in step S212.

When the system is not in an overflow mode (the buffer is not full and data is not being backflowed) as determined in S216, the data from the data source 104 is transferred to the buffer 116 without going to the overflow memory in step 220. Otherwise, if the system is in overflow mode, the new data segment is transferred to overflow memory in step S212. The new data segment remains in overflow memory until enough data has been removed from the buffer 116 that the fill logic 132 determines that the buffer 116 can accept a new data segment. In step S224, the fill logic detects and indicates when the buffer 116 is not full. When the buffer 116 is not full and there is data in the overflow memory 112, the chipset 100 enters a backflow state in which the new data segment from the overflow memory 112 is transferred by the memory control and arbitrator 140 to the buffer 116 in step S228. Data stored in the buffer 116 is eventually transferred to the data user in step S232 regardless of whether the data flowed directly into the buffer from the data source 104 or was backflowed from the overflow memory 112.

By transferring data to an overflow memory when unusually heavy buffer requirements arise, the invention can be designed to handle a worst case situation. During the worst case situation, the chipset operates in a slower mode having to use a single-port overflow memory. However, under normal operating conditions, the buffer operates at a high speed. The implementation of the overflow memory and the described logic allows more moderate size, inexpensive but fast FIFO buffers to be used.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A memory handling system comprising:

a register coupled to a source of data;

a dual-port buffer to receive data;

a fill logic to determine when the dual-port buffer is full; and a memory controller coupled to a single-port overflow memory by a bi-directional bus and to the register, the memory controller routing data from the register to the overflow memory when the fill logic determines that the dual-port buffer is full, back-filling the dual-port buffer with data from the overflow memory when the fill logic determines that the dual-port buffer is no longer full, and routing data from the register to the dual-port buffer when no back-filling is in progress and the fill logic determines that the dual-port buffer is not full.

2. The memory handling system of claim 1 wherein the dual-port buffer and fill logic are placed on an integrated circuit chip and the overflow memory is on a second integrated circuit chip.

3. The memory handling system of claim 1 further comprising:

a multiplexer directing data into said dual-port buffer from the register and the overflow memory, a select line of the multiplexer coupled to the fill logic.

4. The memory handling system of claim 1 wherein an output of the dual-port buffer is coupled to an input of a graphics card.

5. The memory handling system of claim 1 further comprising:

a mapping unit to map the data to discontiguous pages of the overflow memory.

6. The memory handling system of claim 1 wherein the dual-port buffer is a first-in first-out memory device.

7. A method for buffering data comprising:

receiving a data segment in a register from a source of data;

transferring the data segment from the register to a single-port overflow memory by a bi-directional bus if a dual-port buffer is full;

back-filling the dual-port buffer from the overflow memory if the dual-port buffer is no longer full; and transferring the data segment from the register to the dual-port buffer if the dual-port buffer is not full and the dual-port buffer is not being back-filled.

8. The method of claim 7 further comprising directing the data segment from one of the register and the overflow memory to the dual-port buffer with a multiplexer.

9. The method of claim 8 further comprising sending a select register signal to the multiplexer if the dual-port buffer is not full and the dual-port buffer is not being back-filled, and sending a select overflow memory signal to the multiplexer otherwise.

10. The method of claim 8 further comprising comparing a buffer begin pointer and a buffer end pointer to determine if the dual-port buffer is full.

11. A graphics accelerator comprising:

a register coupled to a bi-directional system bus for receiving graphics data from a central processor;

a dual-port buffer to receive the graphics data on a first port and supply the graphics data to a graphics processor on a second port;

a fill logic to determine when the dual-port buffer is full; and a memory controller coupled to a system memory by the bi-directional system bus and to the register, the memory controller routing the graphics data from the register to the system memory when the fill logic determines that the dual-port buffer is full, back-filling the dual-port buffer with the graphics data from the system memory when the fill logic determines that the dual-port buffer is no longer full, and routing the graphics data from the register to the dual-port buffer when no back-filling is in progress and the fill logic determines that the dual-port buffer is not full.

12. The graphics accelerator of claim 11 further comprising:

a multiplexer directing the graphics data into the dual-port buffer from the register and the system memory, a select line of the multiplexer coupled to the fill logic.

13. The graphics accelerator of claim 11 further comprising a mapping unit to map the graphics data to discontiguous pages of the system memory.

14. The graphics accelerator of claim 11 wherein the dual-port buffer is a first-in first-out memory device.

15. A memory handling system comprising:

a register for receiving a data segment from a source of data;

means for transferring the data segment from the register to a single-port overflow memory by a bi-directional bus if a dual-port buffer is full;

means for back-filling the dual-port buffer from the overflow memory if the dual-port buffer is no longer full; and means for transferring the data segment from the register to the dual-port buffer if the dual-port buffer is not full and the dual-port buffer is not being back-filled.

16. The memory-handling system of claim 15 further comprising a multiplexer for directing the data segment from one of the register and the overflow memory to the dual-port buffer.

17. The memory handling system of claim 15 further comprising means for sending a select register signal to the multiplexer if the dual-port buffer is not full and the dual-port buffer is not being back-filled, and sending a select overflow memory signal to the multiplexer otherwise.

18. The memory handling system of claim 15 further comprising means for comparing a buffer begin pointer and a buffer end pointer to determine if the dual-port buffer is full.

* * * * *